(No Model.) 4 Sheets—Sheet 2.
P. EVERITT.
CHECKING APPARATUS.
No. 359,924. Patented Mar. 22, 1887.
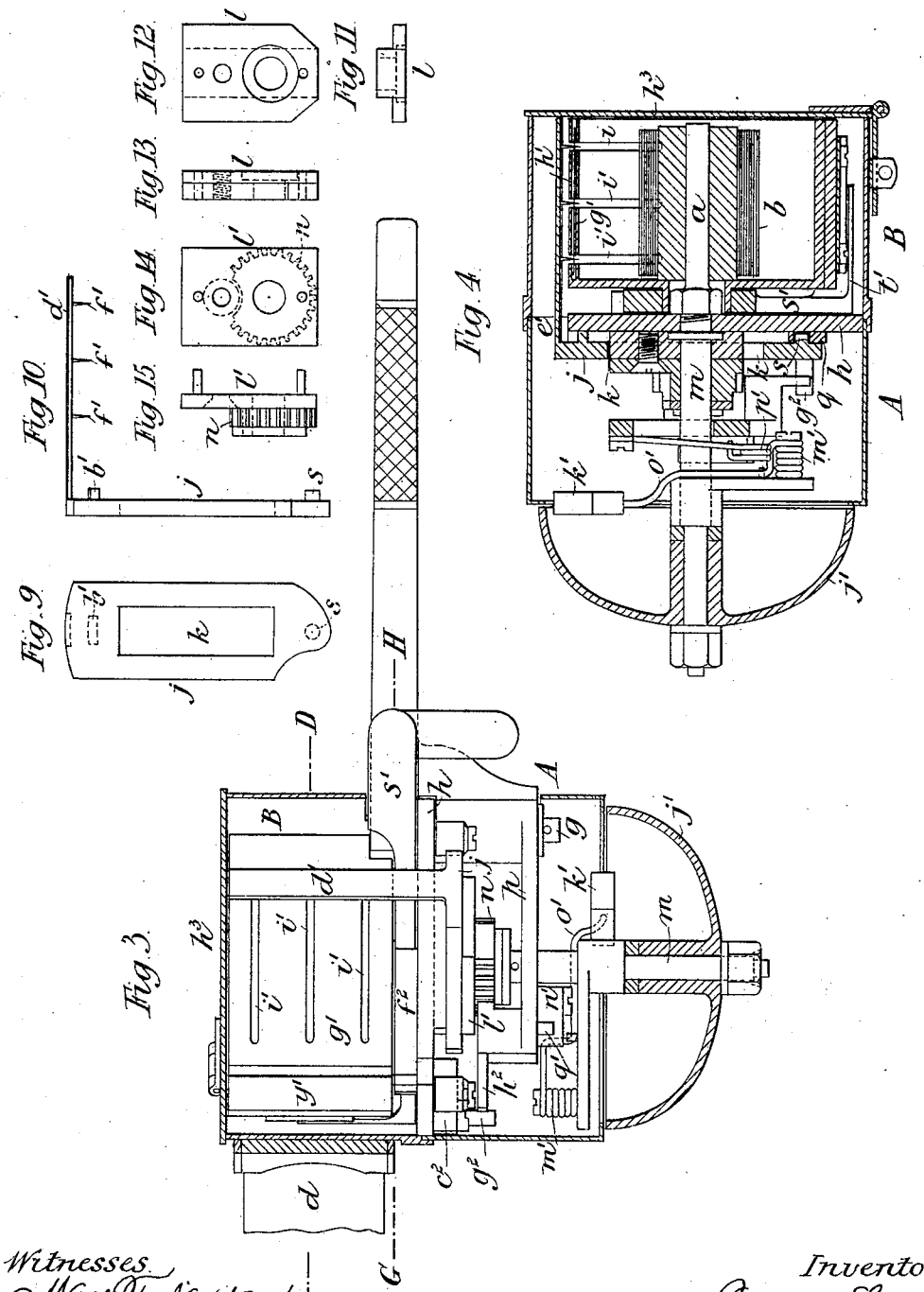
Witnesses
Will T. Norton
R. B. Washington
Inventor
Percival Everitt
by John J. Halsted
his Atty (No Model.) 4 Sheets—Sheet 3.
P. EVERITT.
CHECKING APPARATUS.
No. 359,924. Patented Mar. 22, 1887.
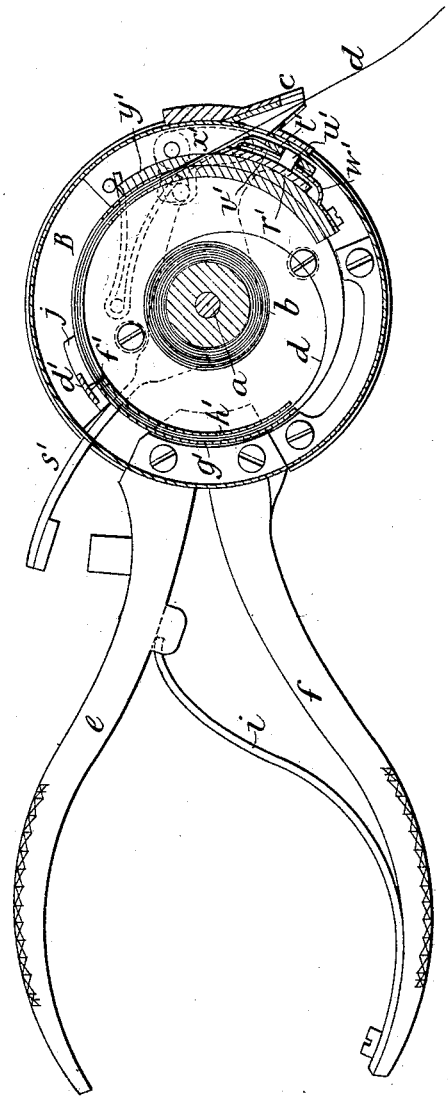
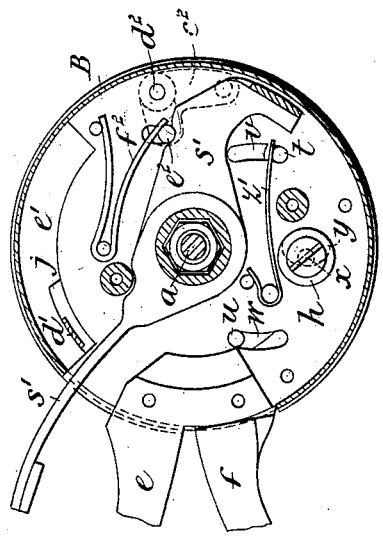
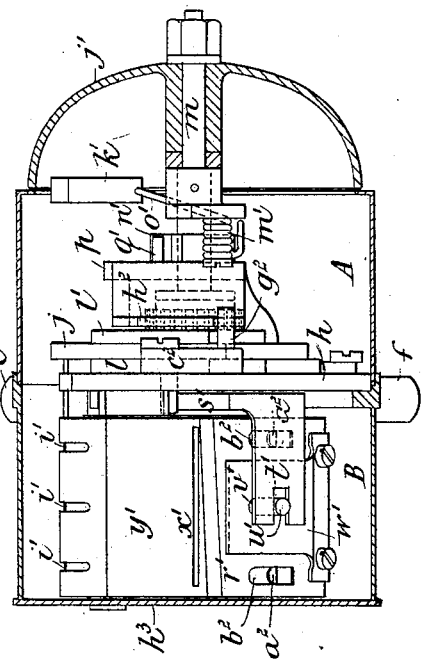
Witnesses
Will T. Norton
R. B. Washington
Inventor
Percival Everitt
by John J. Halsted
his Atty (No Model.) 4 Sheets—Sheet 4.
P. EVERITT.
CHECKING APPARATUS.
No. 359,924. Patented Mar. 22, 1887.
Fig. 16.
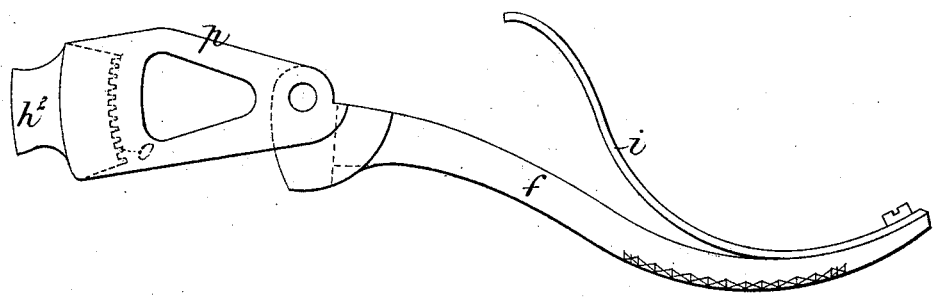
Fig. 17.
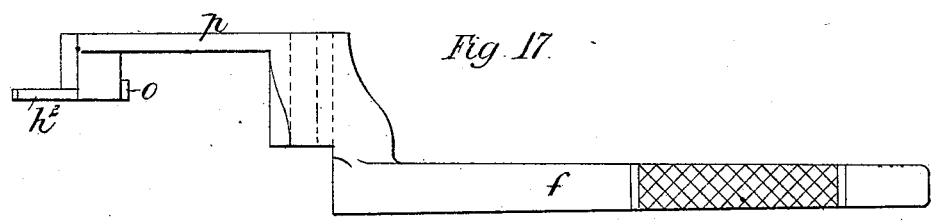
Fig. 20. Fig. 8.
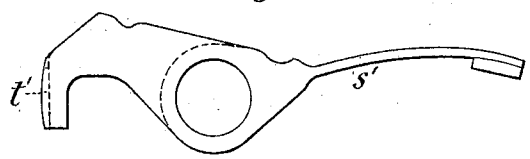
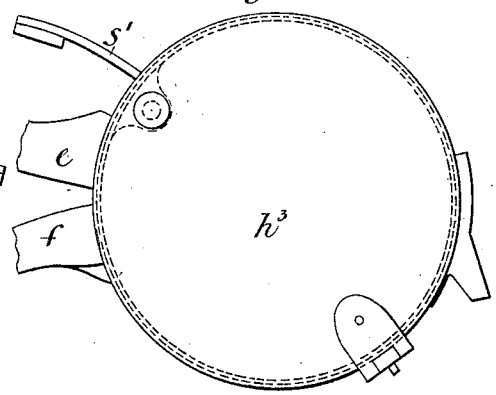
Fig. 21.
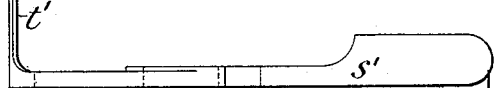
Fig. 22. Fig. 23.
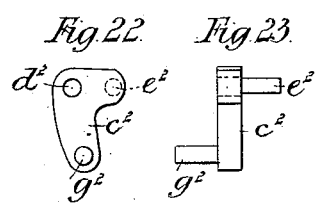
Fig. 18.
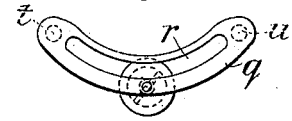
Fig. 19.
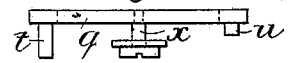
Witnesses
Will T. Norton
B. B. Washington
Inventor
Percival Everitt
by John J. Halsted & Son
his Atty.

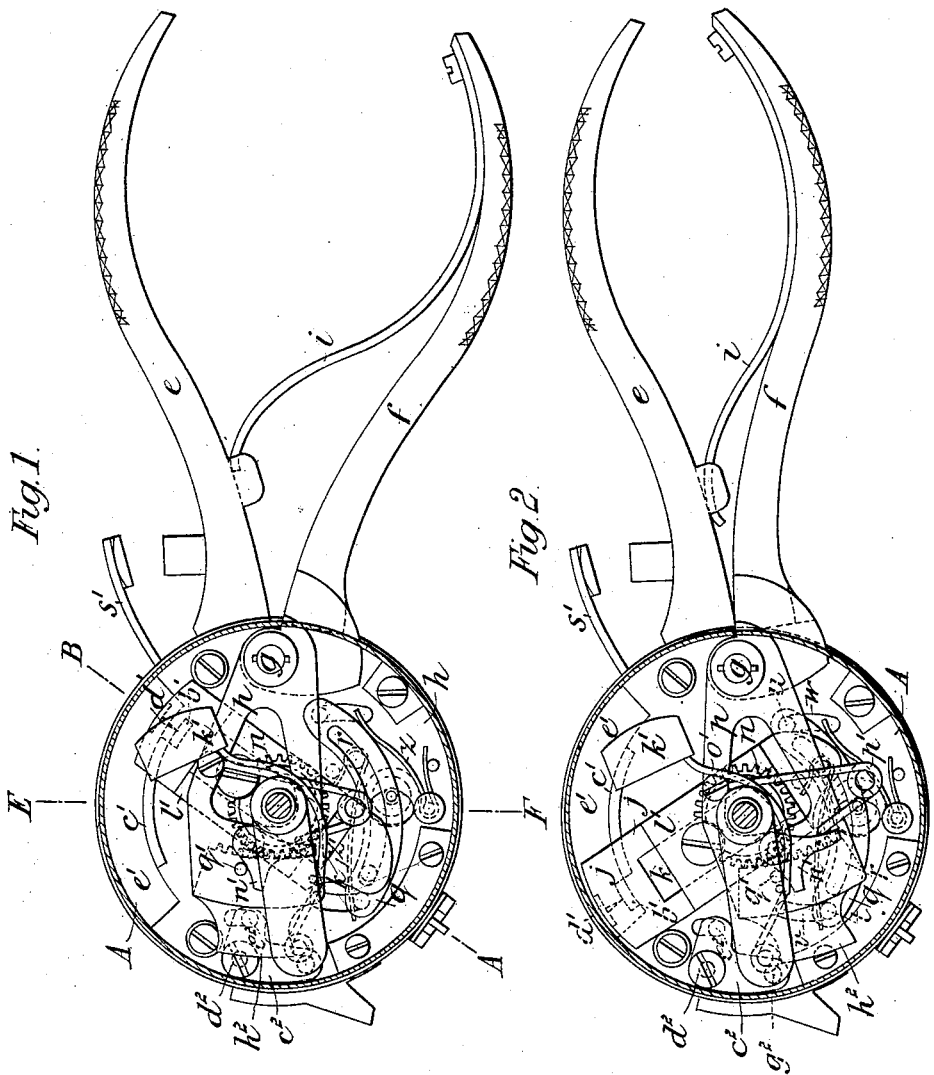

UNITED STATES PATENT OFFICE.

PERCIVAL EVERITT, OF LONDON, ENGLAND.

CHECKING APPARATUS.

SPECIFICATION forming part of Letters Patent No. 359,924, dated March 22, 1887.

Application filed January 28, 1886. Serial No. 190,006. (No model.) Patented in England August 13, 1885, No. 9,659; in France January 13, 1886, No. 173,512; in Belgium January 19, 1886, No. 71,694; in Sweden February 5, 1886, No. 684; in Canada February 19, 1886, No. 23,463; in Victoria March 17, 1886, No. 4,470; in Tasmania March 20, 1886, No, 396/9; in South Australia March 22, 1886, No. 663; in Portugal March 24, 1886, No. 1,031; in Brazil March 27, 1886, No. 340; in Italy March 31, 1886, XX, 19,458, and XXXVIII, 342; in New Zealand April 2, 1886, No. 1,776; in India March 19 and April 8, 1886, No. 31/496; in New South Wales June 2, 1886, No. 1,849; in Germany June 12, 1886, No. 38,318, and in Austria-Hungary July 2, 1886, No. 4,237 and No. 29,542.

*To all whom it may concern:*

Be it known that I, PERCIVAL EVERITT, a subject of the Queen of Great Britain, residing at London, England, have invented new and useful Improvements in Checking Apparatus, (for which I have obtained patents in the following countries, namely: in Great Britain by Letters Patent No. 9,659, dated August 13, 1885; France, No. 173,512, dated January 13, 1886; Belgium, No. 71,694, dated January 19, 1886; Sweden, No. 684, dated February 5, 1886; Canada, No. 23,463, dated February 19, 1886; Victoria, No. 4,470, dated March 17, 1886; India, Register No. 31, dated April 8, 1886, and No. 406, dated March 19, 1886; Tasmania, No. 396/9, dated March 20, 1886; South Australia, No. 663, dated March 22, 1886; Portugal, No. 1,031, dated March 24, 1886; Brazil, No. 340, dated March 27, 1886; Italy, Vol. XX, No. 19,458, and Vol. XXXVIII, No. 342, dated March 31, 1886; New Zealand, No. 1,776, dated April 2, 1886; New South Wales, by Letters of Registration No. 1,849, dated June 2, 1886; Germany, by Letters Patent No. 38,318, dated June 12, 1886, and in Austria-Hungary, No. 4,237 and No. 29,542, dated July 2, 1886,) of which the following is a specification.

The object of my invention is to provide an improved apparatus for preventing, as far as possible, fraud on the part of persons employed to receive money, such as omnibus and tram-car conductors, theater-attendants, and the like.

By my improved apparatus tickets or receipts for money paid are delivered, as hereinafter described, from a reel of paper, (or suitable material,) such paper or other material being divided or marked off in spaces of equal length, which said spaces may be consecutively numbered, say from 1 to 1,000, or as may be found desirable. The said spaces on the reel of paper may be also further marked with the amount of money the attendant is to receive for the said ticket or space of paper. The apparatus also enables the user to cut off the delivered length of paper at the end of each division, so that one or more divisions may be delivered before it is cut off. This will be found desirable where the user of the apparatus is required to receive money in variable amounts, the number of divisions cut off at one time corresponding with the amount of money he receives; and, in order to give publicity and to draw the attention of the payer to the length of ticket or receipt that is being delivered, the apparatus is, when required, provided with a bell which, on delivering the tickets, is caused to strike or ring as each division of paper is delivered outside the apparatus.

In order to carry out my invention, I provide a casing, preferably of a cylindrical form, which contains a reel of paper, the end of which is projected through an opening, the arrangement of casing and reel of paper being similar to the ordinary tape-measures inclosed in a circular case. Attached to the outside of the case is a fixed handle carrying the said case provided with suitable mechanism inside. For delivering the paper there is another handle or lever which is movable on a pivot, as hereinafter more particularly described.

The mechanism inside the casing, which is actuated by the pivoted handle or lever for delivering the paper, may be arranged in various ways. The following is an arrangement which I find very advantageous: At one side of the casing I provide a radial arm sliding on a block, which said block turns on a pivot fixed in the center of the side of the casing. Attached to the block is a pinion, which is actuated by teeth or cogs attached to and near the extremity of the movable lever or handle. As the block is moved round on its center, the radial arm is carried with it, so that on the opening and closing of the handles the arm is alternately moved backward and forward, the radial arm at the same time being free to slide on the block in a direction away from or toward the center pivot.

In order to give the desired sliding motion to the radial arm, I provide a metal plate having a curved slot, into which slot a pin which is fixed to one end of the radial arm projects. This plate is mounted loosely on the side of the casing by two pins fixed to the ends of the plate, and which project into short curved slots in the casing. I provide at each end of the plate springs so arranged that the spring at one end presses the plate toward the center pivot, the spring at the other end pressing the plate away from the center pivot. Near to the other end of the radial arm, and attached thereto, I provide a fixed pin or stud, which takes against a curved guide-plate attached to the side of the casing, the length of the guide-plate corresponding with the length or division of the paper or other material to be cut off. Attached to this end of the radial arm is a projecting piece of metal extending across the casing and over the reel of paper, the said projecting piece of metal being provided with pins to seize hold of the paper. The relative position of these various parts is so arranged that at the normal or open position of the handles the radial arm is pressed by the spring at one end of the metal plate away from the center pivot. In that position the pins on the projecting piece of metal attached to the radial arm will then pierce the paper, and on the motion of the radial arm caused by closing the handles the paper will be moved forward until the stud, taking against the curved plate, is moved to the end of the said curved plate, and at the same time the other end of the radial arm will be in a position to receive the force of the opposing spring, when the radial arm will slide on the block and the pins recede from the paper, leaving it free. By this time the handles will be closed together. On the reverse motion of the radial arm, which takes place when the handles are opened, the projecting stud takes against the upper or outer surface of the curved plate, and the pins are prevented from entering the paper until the arm has moved backward to the other extremity of the curved plate, when, the radial arm being again free to slide on the block, the first spring will again come into action and will bring the arm into its normal position. When it is required to employ a bell, which I find it advantageous to do, it is fixed to the outside of the casing and provided with a hammer actuated by a spring, which may be withdrawn from the bell by a projecting stud or pawl on the movable handle, so that each time the handle is closed the bell is made to ring. A suitable arrangement for cutting off the paper consists of a knife, which may be inside the casing and which may communicate by a cord or lever with a short crank-lever, near the outward extremity of the movable handle. This crank-lever is provided with a projecting stud, which takes against a curved plate attached to the movable handle in such a manner that the crank-lever cannot be operated until the movable handle is quite closed or opened, when the stud on the crank-lever will be at the ends of the curved plate, and the lever actuating the knife can then be operated. At the point where the paper leaves the outer casing I provide two lips to hold the portion of the length of paper forming the ticket when cut off until it is taken away by the person paying the money.

To render the apparatus more convenient for the collection of fares, I propose to provide it, when required, with a suitable receptacle, into which the fares can be placed by the passengers, so that in all cases it will be possible for a conductor or other collector of fares to do all that is requisite by employing one hand.

In order to enable my invention to be fully understood, I will proceed to describe the same by reference to the accompanying drawings, in which—

Figure 1 is a side elevation of a checking apparatus constructed according to my invention, the bell being removed and the casing of the apparatus shown in section in order to show the interior mechanism, the parts of which are in their normal position, or that which they occupy when the handles are open. Fig. 2 is a similar view to Fig. 1, but showing the parts of the mechanism in the position they occupy when the handles are closed. Fig. 3 is a horizontal section taken through the casing and bell of the apparatus and showing a plan of the interior mechanism. Fig. 4 is a section on line A B of Fig. 1. Fig. 5 is a section on line C D of Fig. 3. Fig. 6 is a view showing the casing in section and the interior mechanism in elevation, the section being taken on the line E F of Fig. 1. Fig. 7 is a section on line G H of Fig. 3. Fig. 8 is a side elevation of the apparatus, only part of the handles being shown. Figs. 9 to 23 are detached views of parts of the apparatus.

Similar letters in all the figures represent similar parts.

A B represent the casing, of cylindrical form, and $b$ the reel of paper contained therein and capable of rotating on a spindle, $a$.

$c$ is the opening in the casing through which the end of the paper $d$ is projected.

$e$ is the fixed handle, which carries the case A B. $f$ is the other handle or lever, which operates, as hereinafter described, to deliver the paper $d$. $g$ is the pivot on which the handle $f$ moves, the said pivot being fixed to a plate, $h$, dividing the casing into two compartments, A and B, and to which the casing is attached.

$i$ is the spring, which serves to hold the handles $e$ and $f$ open in their normal position, as in Figs. 1 and 5.

$j$ is the radial arm, situated in the part A of the casing and slotted, as shown at $k$. Figs. 9 and 10 are an elevation and an edge view, respectively, of this arm.

$l\ l'$ represent the block on which the radial arm $j$ slides. The block $l\ l'$ is formed in two parts, one of which parts, $l$, is formed with a reduced portion, as shown in Fig. 11, which is an end elevation of the part $l$, Figs. 12 and 13 representing face and edge views, respectively, of the same. The said reduced portion fits in a slot, $k$, in the arm $j$, and the part $l'$ of the block, (shown in face and edge views, respectively, at Figs. 14 and 15,) which is wider than the reduced portion of the part $l$, being then screwed to the part $l$, the arm $j$ can slide on the reduced portion, the block $l\,l'$ acting as a guide therefor.

$m$ is the pivot fixed in the center of the plate $h$, and on which the block $l\,l'$ turns, carrying with it the radial arm $j$.

$n$ is the pinion fixed to the part $l'$ of the block, and $o\,o$ are the teeth or cogs on the end of the part $p$ of the movable lever or handle $f$, (shown detached in side elevation and plan at Figs. 16 and 17, respectively,) the said part $p$ forming a quadrant, whereby when the handle $f$ is moved on its pivot $m$ the block $l\,l'$ and radial arm $j$ will be rotated.

$q$ is the loose plate for giving the required sliding motion to the radial arm $j$, and $r$ is the curved slot therein. This plate is shown in face and edge views, respectively, at Figs. 18 and 19.

$s$ is the pin on one end of the radial arm $j$, which pin projects into and works in the slot $r$.

$t$ and $u$ are the pins fixed to the ends of the plate $q$.

$v$ and $w$ are the short curved slots in the plate $h$, into which the pins $t$ and $u$, respectively, project and work.

$x$ is a pin or stud at the center of the length of the plate $q$, which pin or stud works in a slot, $y$, in the plate $h$, and serves to assist in keeping the plate $q$ in position.

$z$ and $z'$ are the springs at each end of the plate $q$. The spring $z$ bears against the edge of the plate $q$ and tends to press one end toward the central pivot, $m$, and the other spring, $z'$, bears against the pin $t$ at the opposite end of the plate $q$ and tends to press this end away from the central pivot, $m$.

$b'$ is the pin or stud fixed near the opposite end of the radial arm $j$, and $c'$ is the curved guide-plate against which the pin or stud $b'$ bears. The plate $c'$ is fixed to the plate $h$, and is of a length corresponding with the length or division of the paper to be cut off.

$d'$ is the piece of metal projecting from the radial arm $j$ and extending through a recess, $e'$, cut in the plate $h$ and through the part B of the casing over the reel $b$ of paper $d$.

$f'\,f'\,f'$ are the pins or points with which the projection $d'$ is provided, and which serve to seize hold of the paper and carry it forward, as hereinafter described. The paper $d$, as it comes from the reel $b$, passes between two cylindrical plates, $g'$ and $h'$, forming a guide therefor and serving to hold it while the pins $f'$ enter it.

$i'\,i'$ are slots in the plates $g'$ and $h'$, through which the pins pass to the paper and in which they travel when carrying the paper forward.

$j'$ is the bell, which is fixed to the outside of the part A of the casing, and $k'$ is the hammer of the same.

$m'$ is the spring for actuating the hammer $k'$.

$n'$ is the pawl on the part $p$ of the movable handle $f$, which pawl, when the handle $f$ is moved toward the handle $e$, comes against the rod $o'$, carrying the hammer, and withdraws the same from the bell, and then releases it and causes the bell to ring. On the handle $f$ moving back, the pawl will give way and pass the rod $o'$.

$p'$ is the spring of the pawl, and $q'$ the stop for the same.

$r'$ is the knife inside the casing for cutting off the lengths of paper as the latter is fed through the opening $c$ in the apparatus.

$s'$ is the lever for operating the knife $r'$. The said lever is shown detached in elevation and plan at Figs. 20 and 21, respectively, and has its fulcrum on the pivot $m$. The lever $s'$ is formed with a lateral projection, $t'$, having a slot or recess for receiving a pin, $u'$, on the knife $r'$. The said pin works in a slot, $v'$, in a bracket or plate, $w'$, fixed to a plate, $y'$, on the end of the cylindrical plates $g'$ and $h'$. The paper leaves the plates $g'$ and $h'$ at $x'$, through a slit in the plates $g'$ and $y'$, immediately in front of the edge of the knife.

$a^2\,a^2$ are pins or studs on the plate $y'$, over which pins or studs pass slots $b^2\,b^2$ in the knife $r'$, thereby serving as guides to the knife.

$c^2$ is the crank-lever near the part $p$ at the end of the movable handle $f$. Figs. 22 and 23 represent detached face and edge views, respectively, of this lever, which is in communication with the knife through the lever $s'$, by means of which it is operated in the following manner: The crank-lever $c^2$ pivots at $d^2$, and is provided with a pin or stud, $e^2$, which is caused to bear against the lever $s'$ by a spring, $f^2$, so that when the lever $s'$ is moved on its fulcrum $m$ to operate the knife $r'$ the crank-lever $c^2$ will move with it. The spring $f^2$ at the same time serves to bring back the lever $s'$ when released from pressure. $g^2$ is the projecting stud on the other face of the crank-lever $c^2$.

$h^2$ is the curved plate on the end of the part $p$ of the movable handle $f$, against which the stud $g^2$ takes, and on which it rests while the handle $f$ is being moved, so that the crank-lever $c^2$ cannot be then moved, and consequently the lever $s'$ cannot be depressed to operate the knife. When, however, the handle $f$ is quite closed or opened the plate will be clear of the stud $g^2$, and the knife can then be operated. The opening $c$ is of the form of two lips, and is provided with a piece of india-rubber or other suitable material to hold the ticket or portion of the length of paper when cut off until it is taken away by the person paying the money. $h^3$ is the door of the apparatus, which is provided with suitable means to allow of locking the same.

The operation of the apparatus is as follows: The reel $b$ being supplied with the requisite length of paper $d$, divided or marked off in spaces of equal length, each of which represents a receipt for a predetermined sum of money, (which length must correspond with the distance traversed by the projection $d'$,) the handles $e$ and $f$ must be closed, in order to raise the pins $f'$ out of the slots $i'$. The end of the paper is then passed between the plates $g'$ and $h'$ and round to the lips or opening $c$, and the door $h^3$ of the apparatus being then locked or otherwise secured it is ready for use— by a conductor of an omnibus, for example. Upon the receipt of a fare, which, for example, may be represented by one of the divisions or spaces into which the paper $d$ is divided, the conductor, in order to deliver a ticket or receipt for the amount thereof, (the parts of the apparatus being in the position shown in Figs. 1, 3, 4, 5, 6, and 7,) presses the handles $e$ and $f$ close together into the position shown in Fig. 2. The handle $f$ in turning upon its pivot will, by means of the teeth upon the part $p$, rotate the pinion $n$ and radial arm $j$, the projection $d'$ of which will, by means of the pins $f'$, carry forward the strip of paper $d$ to the extent of one division thereof, the arm $j$ being guided by the pin or stud $b'$ thereon, bearing upon the under side of the curved guide-plate $c'$. As soon, however, as the handles $e$ and $f$ have closed together the pin or stud will have passed the end of the plate $c'$, and the pin $s$ will have moved in the slot $r$ to that end of the plate $q$ which carries the pin $u$, and the spring $z$, pressing against the plate $q$, will force the radial arm $j$ (which is no longer restrained by the plate $c'$) to slide upward and withdraw the pins from the strip of paper $d$, as shown in Fig. 2. The crank-lever $c^2$ will now be free to move downward, as its stud $g^2$ will be clear of the plate $h^2$, and the lever $s'$ can therefore be depressed and the knife $r'$ operated to cut off the length of paper which has been fed forward, and the person paying the fare can then take the cut off ticket or receipt. As the handle $f$ is moved on its pivot to feed forward the paper $c$, as just described, the pawl $n'$ on the said part $p$ will come against a cranked part of the rod $o'$, carrying the hammer $k'$ of the bell $j'$, and by bearing against its stop $q'$ will first move the hammer away from the bell, and then, sliding past the said cranked part of the rod $o'$, will release the hammer, which will sound the bell. Pressure being now removed from the handles $e$ and $f$, the radial arm $j$, with its projection $d'$, will move back into its original position, the stud $b'$ sliding on the upper surface of the curved guide-plate $c'$, whereby the pins $f'$ are kept from contact with the paper $d$. When, however, the handles have been completely opened by their spring $i$, the radial arm $j$ and projection $d'$ will be moved down into the position shown in Figs. 1 and 4 by the end of the plate $q$, carrying the pin $t$, being forced outward from the pivot $m$ by its spring $z'$, the pin $s$ on the end of the radial arm having then moved in the slot $r$ to the said end of the plate. Should the conductor have omitted to cut off the ticket while the handles $e$ and $f$ were closed, this operation can now be effected in the manner hereinbefore described.

As the crank-lever $c^2$ will be again clear of the curved plate $h^2$, the handle $f$ in opening will have carried back the pawl $n'$, which, on coming against the cranked part of the rod $o'$ carrying the hammer of the bell, will be turned on its pivot, and when it has passed by the rod $o'$ will be moved into its original position by its spring $p'$, ready to operate the bell when the apparatus is again used to feed forward a ticket or length of the paper $d$.

If the fare to be paid be represented by two or more lengths or divisions of the paper $d$, the conductor would operate the handles $e\ f$ two or more times in the manner hereinbefore described, so as to feed forward two or more of the said lengths or divisions, and would then depress the lever $s'$, and thereby cut them off, the bell being sounded at each operation of the handles $e\ f$.

When the whole of the strip of paper $d$ has been used, a fresh strip is placed in the apparatus, and it will be obvious that the money received by the conductor in payment of fares must correspond with the number of lengths or divisions which have been delivered by the apparatus. It will also be obvious that, if required, the herein-described arrangement of parts for operating a bell can be dispensed with.

Having now particularly described and ascertained the nature of my said invention and in what manner the same is to be performed, I declare that what I claim is—

1. A checking apparatus having in combination two handles constructed substantially as described and adapted to feed a given length of paper from a reel, and a knife or cutter attached to a supplemental lever, $s'$, arranged to be actuated at the will of the operator, and when actuated to cut off the paper at any desired length, substantially as set forth.

2. A checking apparatus having in combination two handles constructed substantially as described and adapted to feed a desired length of paper from a reel, a knife or cutter attached to a supplemental lever, $s'$, arranged to be operated at the will of the operator, and a piece of rubber or similar material adapted to hold ready for delivery the paper when cut off, substantially as set forth.

3. A checking apparatus having in combination two handles constructed substantially as described and adapted to feed the desired length of paper from a reel, a knife or cutter attached to a supplemental lever, $s'$, arranged to be operated at the will of the operator, and a hammer and bell, substantially as set forth.

4. In a checking apparatus, the combination, with a pivoted handle having a quadrant end and guide-plate, of a sliding radial arm, $j$, provided with a projection having pins, the said parts operating to feed forward the paper or other material when the handle is closed, substantially as hereinbefore described, and represented in the accompanying drawings.

5. In a checking apparatus, the combination, with the reel-spindle and with the mechanism for feeding forward the paper or other material, of the slotted guide-plates $g'$ $h'$, concentric with each other and with the reel-spindle, substantially as and for the purpose hereinbefore shown and described.

6. A checking apparatus having in combination two handles, one of which is a reacting lever, feeding-pins actuated by such lever for feeding forward and guiding the paper or other material, and an independent lever adapted to be operated at will for cutting off any desired length of paper fed forward.

7. A checking apparatus having the described mechanism for feeding forward the paper and an independent hand-lever for cutting off at will any desired length of paper, and having the spring-pawl $n$, hammer $k$, and bell $j'$, arranged and operating substantially as and for the purpose hereinbefore shown and described.

8. In combination, the fixed and lever handles, teeth $o$, pinion $n$, sliding radial arm $j$, pivoted block $l\ l'$, slotted plate $q$, springs $z\ z'$, plates $g'\ h'$, lever $c^2$, lever $s'$, and knife $r'$, these parts operating substantially as shown and described.

PERCIVAL EVERITT.

Witnesses:
   G. F. REDFERN,
   A. ALBUTT.